(12) United States Patent
Cavallaro et al.

(10) Patent No.: US 6,547,097 B1
(45) Date of Patent: Apr. 15, 2003

(54) DISPENSING APPARATUS AND METHOD

(75) Inventors: William Anthony Cavallaro, Bradford, MA (US); William M. Kocsis, Jr., Clearwater, FL (US)

(73) Assignee: The Knight Group LLC, Haverhill, MA (US)

( * ) Notice: Subject to any disclaimer, the term of this patent is extended or adjusted under 35 U.S.C. 154(b) by 0 days.

(21) Appl. No.: 09/579,594

(22) Filed: May 26, 2000

Related U.S. Application Data

(60) Provisional application No. 60/137,141, filed on May 27, 1999.

(51) Int. Cl.[7] .............. A47F 1/04; G07F 11/16; G07F 11/00; B65H 3/00; B23K 35/12
(52) U.S. Cl. .............. 221/306; 221/195; 221/197; 221/276; 221/265; 221/224; 221/278; 228/41; 228/245; 228/244; 228/246; 406/64
(58) Field of Search .................. 221/195, 197, 221/276, 265, 278, 306, 224, 211; 228/41, 245, 244, 246; 406/64, 65, 68, 85, 141, 143

(56) References Cited

U.S. PATENT DOCUMENTS

| | | | | |
|---|---|---|---|---|
| 3,572,703 A | * | 3/1971 | Greene ................... 273/1 |
| 3,616,967 A | * | 11/1971 | Mueller ................. 221/188 |
| 3,785,525 A | * | 1/1974 | Handeland ............. 221/265 |
| 3,788,518 A | * | 1/1974 | Beebe .................... 221/211 |
| 3,883,040 A | * | 5/1975 | Bell ....................... 221/224 |
| 3,921,851 A | * | 11/1975 | Nilson .................... 221/265 |
| 4,033,031 A | * | 7/1977 | Ballew .................... 29/626 |
| 4,278,184 A | * | 7/1981 | Willis ..................... 221/233 |
| 4,324,347 A | * | 4/1982 | Thomas .................. 221/237 |
| 4,560,100 A | * | 12/1985 | Hall ........................ 228/40 |
| 4,653,665 A | * | 3/1987 | Heisner et al. ........... 221/11 |
| 4,667,959 A | * | 5/1987 | Pfeiffer et al. ........... 273/149 |
| 4,674,651 A | * | 6/1987 | Scidmore et al. ........ 221/3 |
| 4,838,453 A | * | 6/1989 | Suckstead .............. 221/2 |
| 5,042,686 A | * | 8/1991 | Stucki .................... 221/13 |
| 5,159,581 A | * | 10/1992 | Agans .................... 368/10 |
| 5,205,896 A | * | 4/1993 | Brown et al. ........... 156/297 |
| 5,279,045 A | * | 1/1994 | Odashima et al. ....... 34/10 |
| 5,480,062 A | * | 1/1996 | Rogers et al. ........... 221/174 |
| 5,582,493 A | * | 12/1996 | Hineno et al. .......... 406/137 |
| 5,609,268 A | * | 3/1997 | Shaw ...................... 221/2 |
| 5,649,356 A | * | 7/1997 | Gieskes .................. 29/833 |
| 5,655,704 A | * | 8/1997 | Sakemi et al. .......... 228/246 |
| 5,725,124 A | * | 3/1998 | Bustos et al. ........... 221/211 |
| 5,803,309 A | * | 9/1998 | Yuyama et al. ......... 221/82 |
| 5,852,911 A | * | 12/1998 | Yuyama et al. ......... 53/168 |
| 5,927,546 A | * | 7/1999 | Yuyama et al. ......... 221/265 |
| 6,056,190 A | * | 5/2000 | Foulke et al. ........... 228/246 |
| 6,073,817 A | * | 6/2000 | Jairazbhoy ............. 222/595 |
| 6,088,911 A | * | 7/2000 | Isogai et al. ............ 29/740 |
| 6,170,226 B1 | * | 1/2001 | Chang .................... 53/64 |
| 6,189,676 B1 | * | 2/2001 | Ansaloni ................ 198/399 |
| 6,202,918 B1 | * | 3/2001 | Hertz ..................... 228/246 |
| 6,208,911 B1 | * | 3/2001 | Yamaoka et al. ....... 700/242 |
| 6,227,437 B1 | * | 5/2001 | Razon et al. ........... 228/254 |
| 6,234,343 B1 | * | 5/2001 | Papp ...................... 221/7 |
| 6,253,992 B1 | | 7/2001 | Fjelstad | |

FOREIGN PATENT DOCUMENTS

| | | | | |
|---|---|---|---|---|
| JP | 9-323701 | * | 12/1997 | ............. B65B/1/30 |
| JP | 10-192367 | * | 7/1998 | ............. A61J/3/00 |

* cited by examiner

Primary Examiner—Donald P. Walsh
Assistant Examiner—Michael E. Butler
(74) Attorney, Agent, or Firm—Hale and Dorr LLP

(57) ABSTRACT

Dispensing apparatus is provided for dispensing items. The dispensing apparatus includes a dispensing outlet and an item holder having item holding areas and being movably disposed to position the item holding areas one at a time in sequence over the dispensing outlet so that when one of the item holding areas is positioned over the dispensing outlet, the other item holding areas are not disposed over the dispensing outlet. The dispensing apparatus further includes a blocker disposed over the item holder opposite the dispensing outlet, the blocker blocking access to the dispensing outlet from directly above the item holder when the item holder positions one of the item holding areas over the dispensing outlet.

36 Claims, 8 Drawing Sheets

DISPENSING APPARATUS AND METHOD

CROSS-REFERENCE TO RELATED APPLICATIONS

This application claims the benefit of U.S. Provisional Application Serial No. 60/137,141 entitled "DISPENSING APPARATUS AND METHOD" filed on May 27, 1999, incorporated herein.

BACKGROUND OF THE INVENTION

This application relates to dispensing.

Many applications call for an automatic mechanism that dispenses a desired amount of a material. For example, in an automatic assembly line used in producing semiconductor-based electronic circuits, when an electronic part such as a chip resistor, a capacitor, or a packaged integrated circuit ("IC") is to be mounted onto a substrate having a circuit pattern formed thereon, creamy solder is deposited in a selected position on the substrate by use of a dispenser and then the electronic part is automatically mounted in the selected position by use of a chip mounter.

Other applications use solder spheres, also known as solder balls, instead of creamy solder or as electrical connection points known as leads. For example, high density I/O chip carriers use ball grid array packages ("BGAs") that have a high I/O count at a relatively coarse pitch. Typically, the solder balls are dispensed in a predetermined pattern on or in an electronic part or circuit. In some cases, the electronic part or circuit can be rendered inoperative even if only a single solder ball is missing from the pattern after an attempt has been made to dispense solder balls in the pattern on the part or circuit. In such a case, the only means (or the only cost effective means) available for dispensing the solder balls may be a device, such as a stencil having apertures as disclosed in U.S. Pat. No. 5,431,332 which is incorporated by reference, that is provided for dispensing a large amount of solder balls at once on a clean substrate, i.e., a substrate having no solder balls. If so, it may be impossible or impractical to use the available device to dispense a single solder ball, and therefore it may be necessary to discard the part that is missing the single solder ball.

SUMMARY OF THE INVENTION

Apparatus and a method are provided for dispensing. In particular, dispensing apparatus is provided for dispensing items. The dispensing apparatus includes a dispensing outlet and an item holder having item holding areas and being movably disposed to position the item holding areas one at a time in sequence over the dispensing outlet so that when one of the item holding areas is positioned over the dispensing outlet, the other item holding areas are not disposed over the dispensing outlet. The dispensing apparatus further includes a blocker disposed over the item holder opposite the dispensing outlet, the blocker blocking access to the dispensing outlet from directly above the item holder when the item holder positions one of the item holding areas over the dispensing outlet. The apparatus and method allow the dispensing of items to be controlled so that only one of the items is dispensed at a time. An item such as a solder ball can be dispensed at a selected destination by positioning the dispensing outlet appropriately with respect to the selected destination (e.g., above a selected circuit board location) and then rotating the item holder to bring the item to the dispensing outlet.

Other features and advantages will become apparent from the following description, including the drawings, and from the claims.

DETAILED DESCRIPTION

Figure 1:
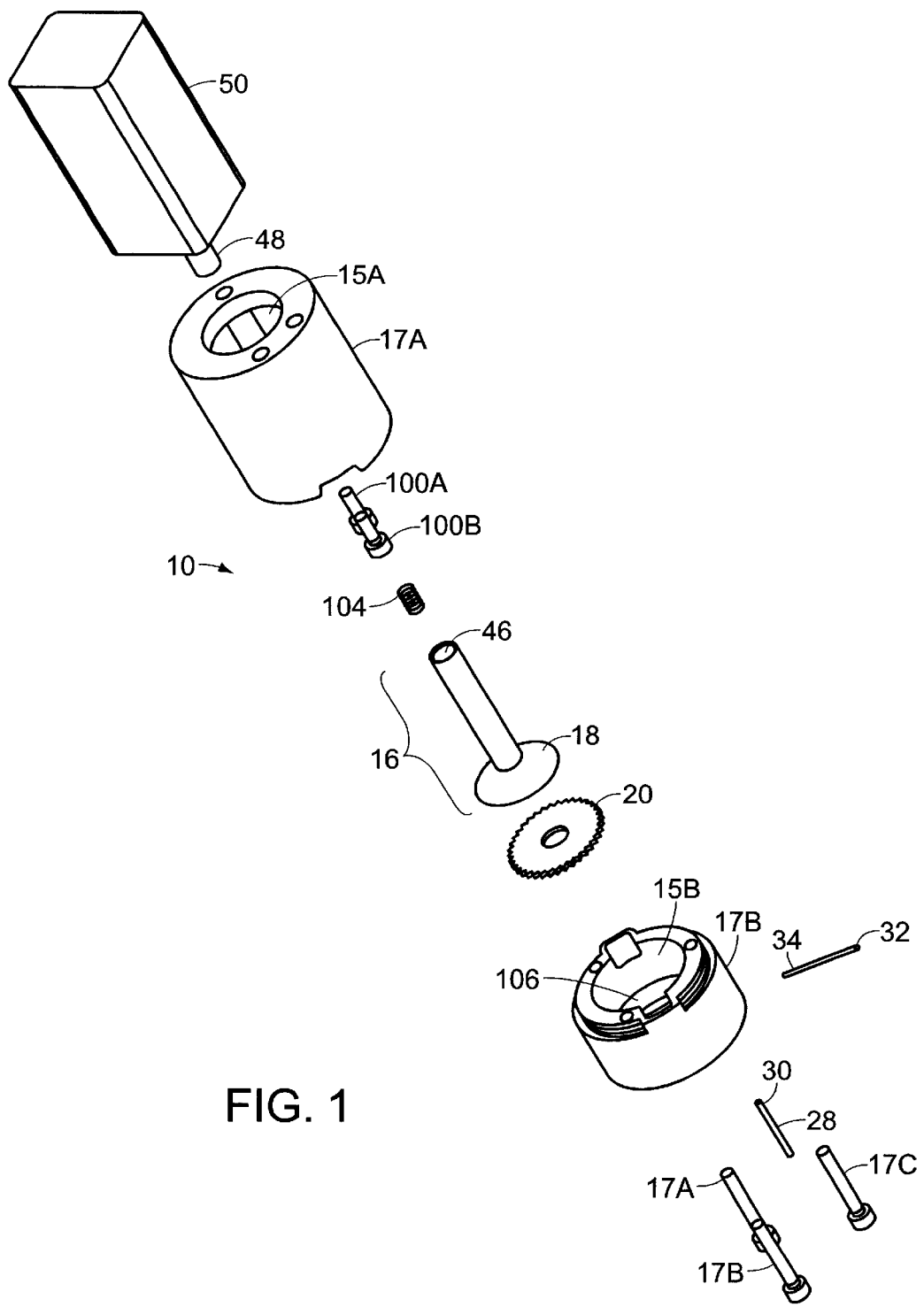
FIG. 1 is an exploded perspective view of a solder ball dispenser.
Figure 3:
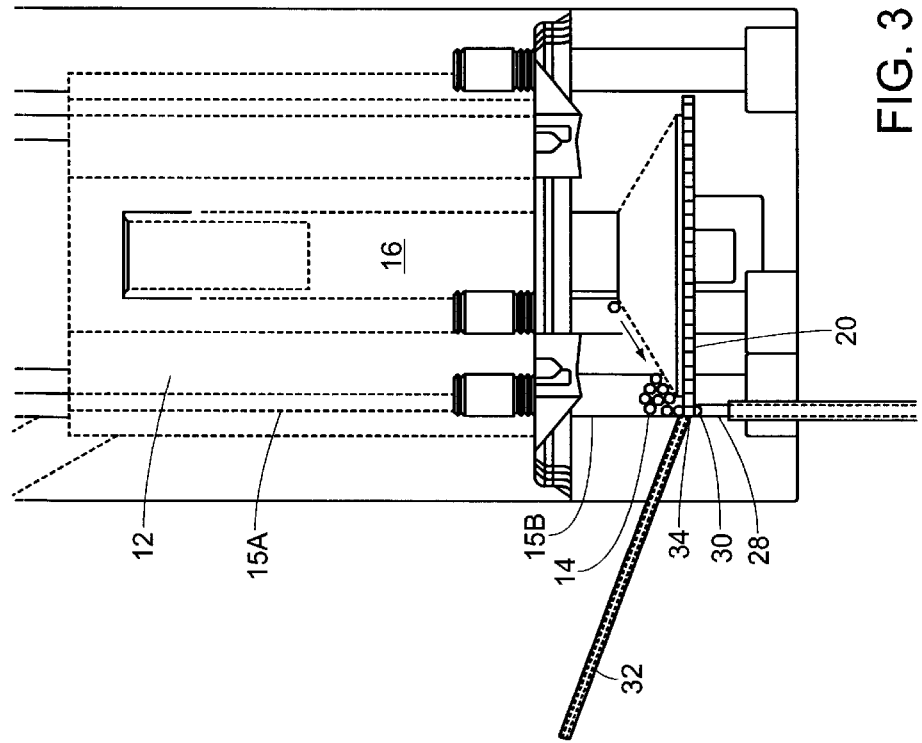
FIG. 3 is a diagrammatic side assembled view of a lower portion of the solder ball dispenser.
Figure 2:
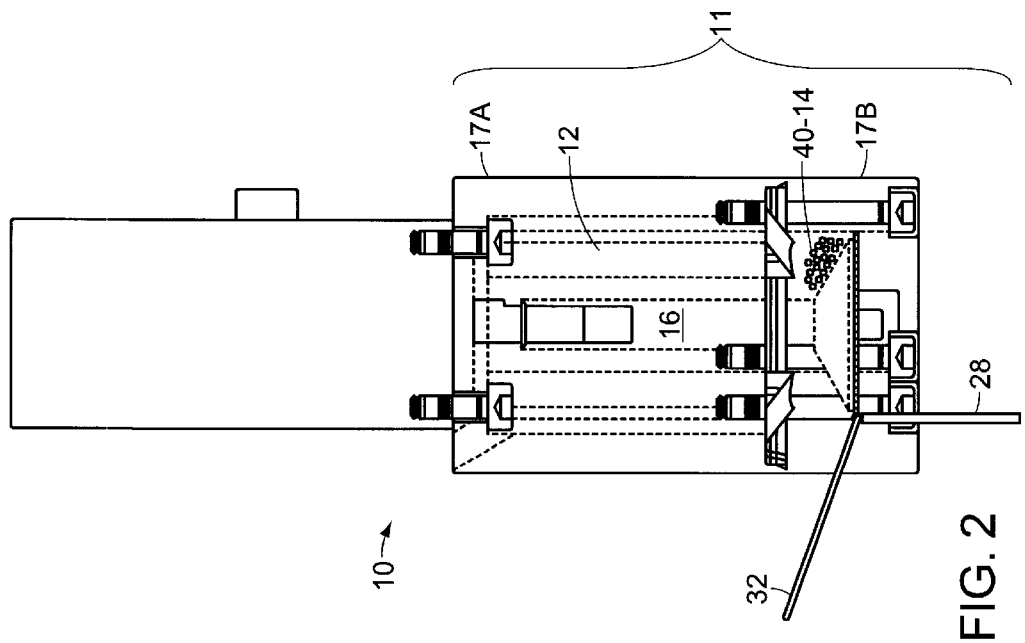
FIG. 2 is a side assembled view of the solder ball dispenser.
Figure 5:
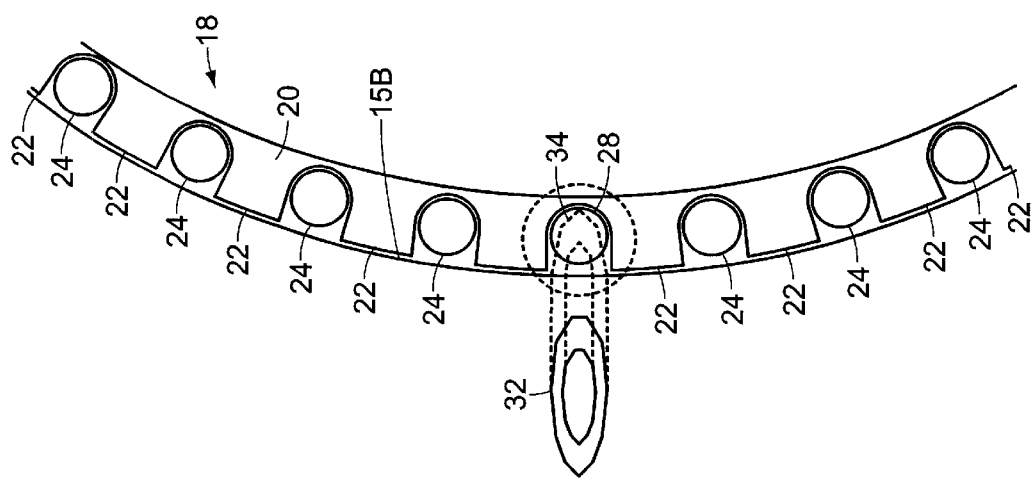
FIG. 5 is a diagrammatic partial top assembled view of the lower portion of the solder ball dispenser.
Figure 4:
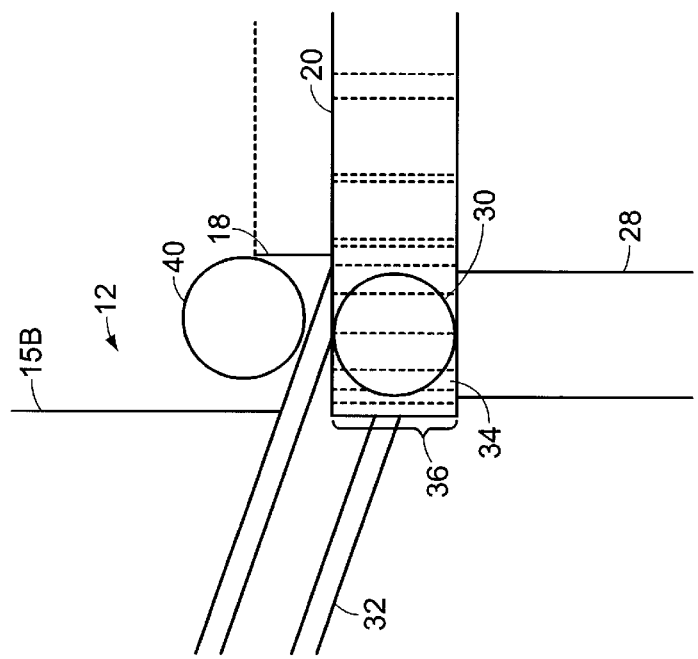
FIG. 4 is a diagrammatic partial side assembled view of the lower portion of the solder ball dispenser.

FIGS. 1 and 2 illustrate an exploded perspective view and a side assembled view, respectively, of a solder ball dispenser 10, having a lower portion 11, that is able to dispense a single ball of solder at a time. FIGS. 3–5 show lower portion 11 of assembled dispenser 10 diagrammatically in side, partial side, and partial top views, respectively, that are not necessarily to scale. As shown in FIGS. 2–3, dispenser 10 includes a chamber 12 in which solder balls 14 (including a specific example solder ball 40 shown in FIG. 4) are held before being dispensed. (Only a small number of solder balls 14 are shown; in typical use, chamber 12 is filled with solder balls.) Chamber 12 is bounded by internal walls 15a–15b (FIG. 1) of outer casings 17a–17b.

Figure 6:
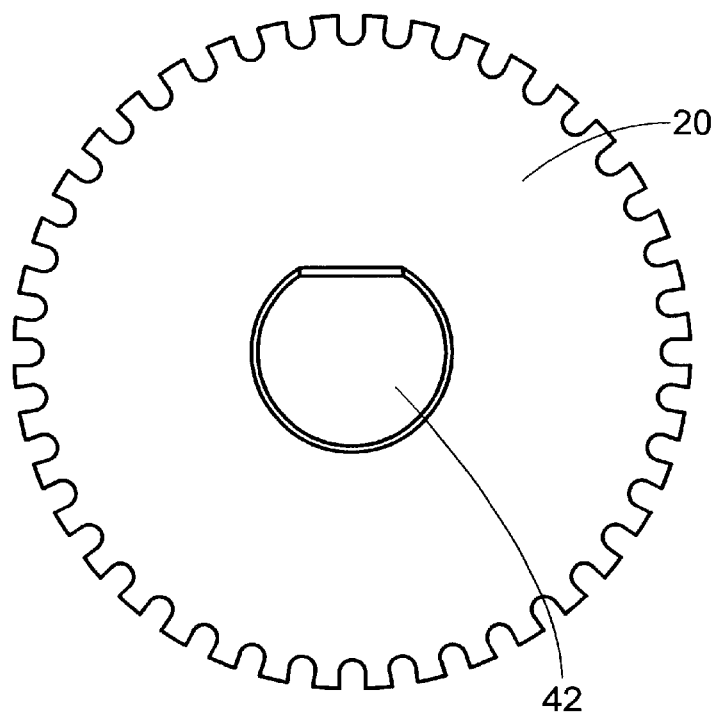
FIG. 6 is a plan view of a toothed disc of the solder ball dispenser.
Figure 7:
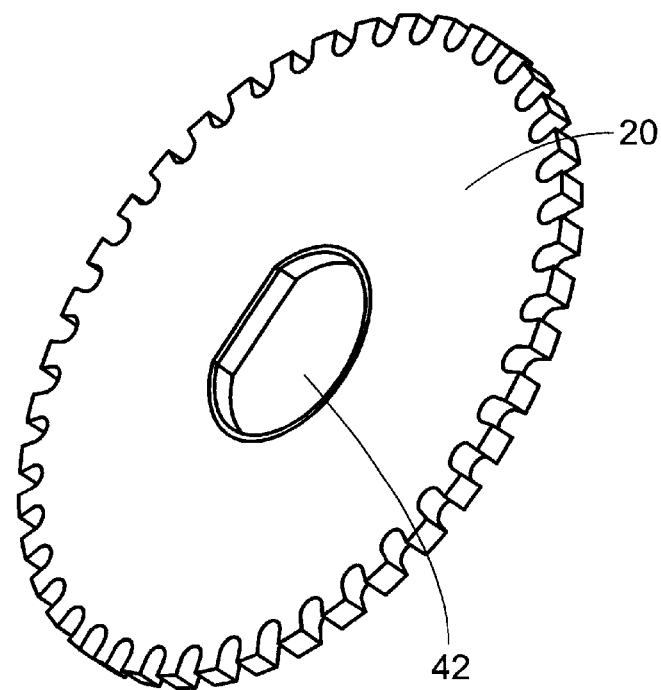
FIG. 7 is a perspective view of the toothed disc of the solder ball dispenser.

Disposed within chamber 12 is a shaft 16 (FIGS. 1–3) having a flared bottom 18 disposed over a toothed disc 20 that is shown in FIG. 1 and in top and perspective views in FIGS. 6 and 7, respectively. As illustrated in FIGS. 3 and 5, the flared bottom and toothed disc are arranged so that the solder balls are directed to the perimeter of the flared bottom, where at least some of the solder balls drop into positions 24 between the teeth 22 of the toothed disc and bounded by wall 15b. A dispensing tube 28 shown in FIGS. 1–4 has an end 30 disposed at the perimeter of the flared bottom and under the edge of the toothed disc so that when the toothed disc rotates and thereby carries a solder ball to a location above the end 30, gravity helps to direct the solder ball into the dispensing tube.

Air under pressure from an air tube 32 (FIGS. 1–5) also helps to direct the solder ball into the dispensing tube 28. FIGS. 4–5 illustrate that an end 34 of air tube 32 is disposed above end 30 of the dispensing tube at a height 36 that is sufficient to allow the toothed disc to rotate between end 34 and end 30, and thereby to carry a solder ball to the location above the end 30, but that causes solder balls to be blocked from entering the location above the end 30 in another way. For example, since end 34 physically separates solder ball 40 (FIG. 4), which is at the perimeter of the flared bottom but has not yet dropped into one of the positions 24, from the location above the end 30, ball 40 cannot enter the location above the end 30 without first dropping into one of the positions 24. End 34 is spaced apart from the flared bottom and the toothed disc by a distance that is sufficient to allow the flared bottom and the toothed disc freedom of movement relative to end 34 but that is insufficient to allow solder balls to enter the location above the end 30 other than by rotation of the toothed disc.

Figure 8A:
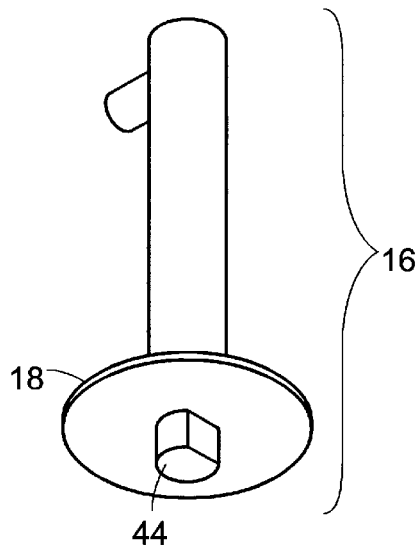
FIGS. 8A–8B are perspective views of a shaft of the solder ball dispenser.
Figure 8B:
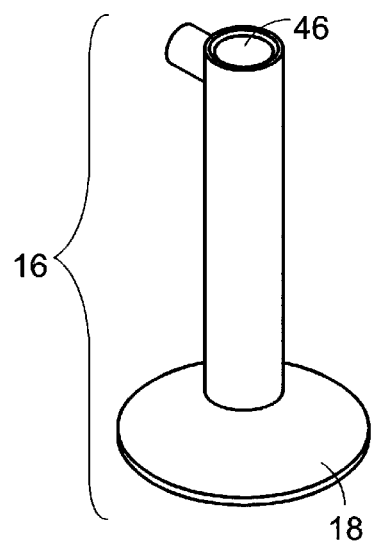

The toothed disc is rotated under precision control. As shown in FIGS. 6–7 and in FIG. 8A, the toothed disc has an opening 42 and shaft 16 has a bottom protrusion 44 that is keyed to opening 42. FIGS. 1–2, 8B, and 9–10 show that shaft 16 has a top opening 46, into which fits a keyed drive pin 48 of an electric motor 50 such as a servo or stepper motor. (A pneumatic indexer or a mechanical indexer, perhaps driven by pneumatics or an electric solenoid, could be used in addition to or in place of the electric motor 50.) As a result, when the electric motor rotates keyed drive pin 48, shaft 16 is rotated, which rotates the toothed disc. Where positions 24 are spaced regularly around the toothed disc, electric motor 50 causes solder balls to be dispensed one at a time, by rotating in steps by the same fixed amount in each step. For example, if the toothed disc has 40 positions 24 that are regularly spaced, the fixed amount is 9 degrees, which causes the toothed disc to make one full rotation in 40 steps.

Figure 9:
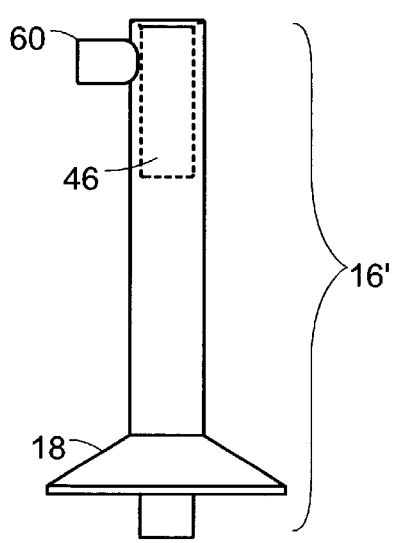
FIG. 9 is a diagrammatic side view of the shaft of the solder ball dispenser.
Figure 10:
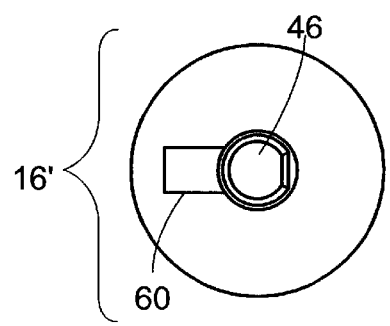
FIG. 10 is a diagrammatic top view of the shaft of the solder ball dispenser.
Figure 11:
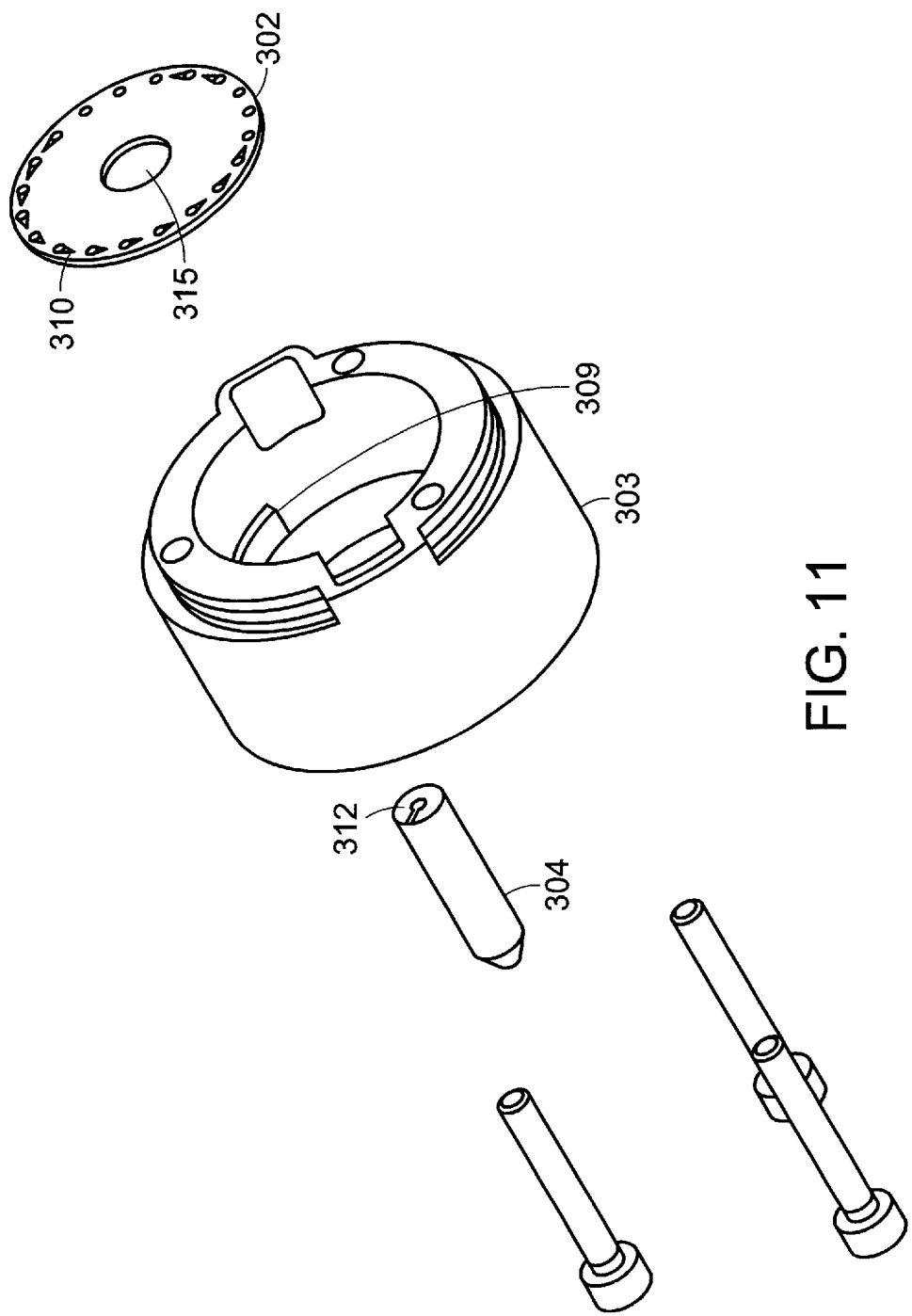
FIG. 11 is an exploded perspective view of portions of a solder ball dispenser.

In particular, FIGS. 9–10 show side and top views, respectively, of a specific embodiment 16' of shaft 16. Shaft 16' has a tab 60 that can serve as a switch contact to allow a sensor to detect the rotational position of the shaft 16', and accordingly the rotational position of the toothed disc. Such detection is desirable because such detection can be used to provide feedback to help prevent the electric motor from leaving the toothed disc in an "in-between" rotational position in which one of the teeth 22, not one of the positions 24, is disposed over the end 30 and thereby undesirably blocks solder balls from entering the location above the end 30. Tab 60 allows the initial position of the toothed disc to be determined so that one of the positions 24 can be lined up desirably over the end 30 and then subsequent positions are correspondingly lined up as the rotation proceeds in steps.

Figure 14:
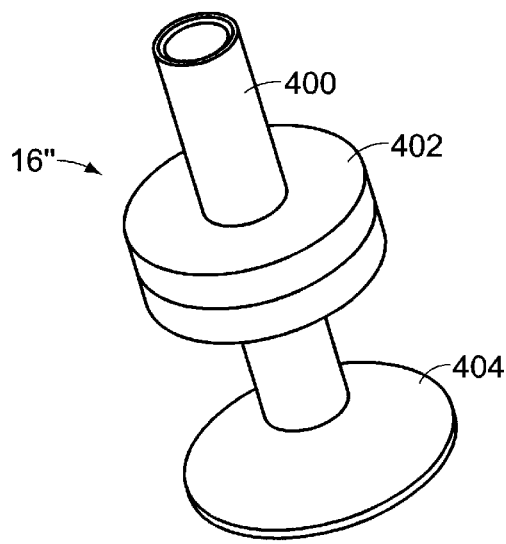
FIG. 14 is a perspective view of a shaft mechanism.

FIG. 14 (not necessarily to scale) illustrates another embodiment 16" of the shaft 16. Shaft 16" includes three pieces: a top portion 400, an electromagnetic clutch 402, and a bottom portion 404. Clutch 402 is normally engaged so that top portion 400 is linked to bottom portion 404 so that top portion 400 can cause bottom portion 404 to rotate. Clutch 402 serves as a slip clutch to provide a safety mechanism in case bottom portion 404 develops excessive resistance to rotation (e.g., because a solder ball has become jammed). Clutch 402 also allows shaft 16" to be aligned in a set up procedure in which clutch 402 is disengaged electromagnetically, a pin is inserted up through the dispensing tube to hold bottom portion 404 steady, top portion 400 is rotated to an aligned position (see the discussion of shaft 16' above), and clutch 402 is re-engaged to resume the link between top portion 400 and bottom portion 404. In a specific embodiment, clutch 402 is characterized by a breakaway force in the range of 1 to 2 inch ounces. The breakaway force is the amount of force required to cause disengagement of clutch 402 when clutch 402 is electromagnetically set to engage. Thus, for example, if bottom portion 404 develops excessive resistance to rotation such that the top portion is driven by a force greater than the breakaway force in an effort to overcome the excessive resistance, clutch 402 automatically disengages, which breaks the link between top portion 400 and bottom portion 404, to help prevent permanent damage to the dispenser, such as motor burnout or disconfiguration of dispenser components.

Positions 24, dispensing tube 28, and air tube 32 may be sized to correspond to the size of solder balls 14, each of which may have a diameter such as 30, 20, 15, 12, or 8 thousands of an inch. Solder balls of other sizes may be used. Toothed disc 20 may changed to correspond to the size of the solder balls used. Chamber 12 may be sized to have a capacity to hold up to a particular quantity of solder balls 14, such as 36,000 solder balls 14. Other capacities are possible. (In at least some cases, one or more of the components such as the disc, the dispensing tube, and the chamber may be "swappable" such that the mechanism can be adjusted appropriately to work with solder balls of different sizes.) In a specific embodiment, one or more of the surfaces of at least shaft 16, walls 15a–15b, and the toothed disc may be made from conductive metal, such as nickel-plate aluminum, and one or more of such surfaces may be electrically grounded to help prevent static electricity from excessively affecting the dispensing.

End 34 may be shaped so that solder balls are scooped away from the location above the end 30 as shaft 16 and the toothed disc are rotated.

The angle of the flared bottom from vertical, which angle may be 60 degrees, may be chosen to allow sufficient gravitational urging of solder balls 14 toward the perimeter of the flared bottom but also to provide chamber 12 with a large capacity.

Each of the tubes may be made from or include commercial hypodermic tubing. The air delivered by air tube 32 may include ionized air to help prevent static electricity from excessively affecting the dispensing, and may be pulsed in synchronization with the stepped rotation of the toothed disc to produce more controlled dispensing and to save energy. The synchronization may be accomplished by use of a central control mechanism that may include an appropriately programmed general purpose computer or an application specific integrated circuit.

FIG. 1 also illustrates screws 100a–b for securing the motor 50 to outer casing 17a, screws 102a–c for securing outer casing 17a to outer casing 17b, and a spring 104 provided to give a light downward force between pin 48 and opening 46 to keep toothed disc 20 firmly against a corresponding mating surface 106 of outer casing 17b.

Figure 12A:
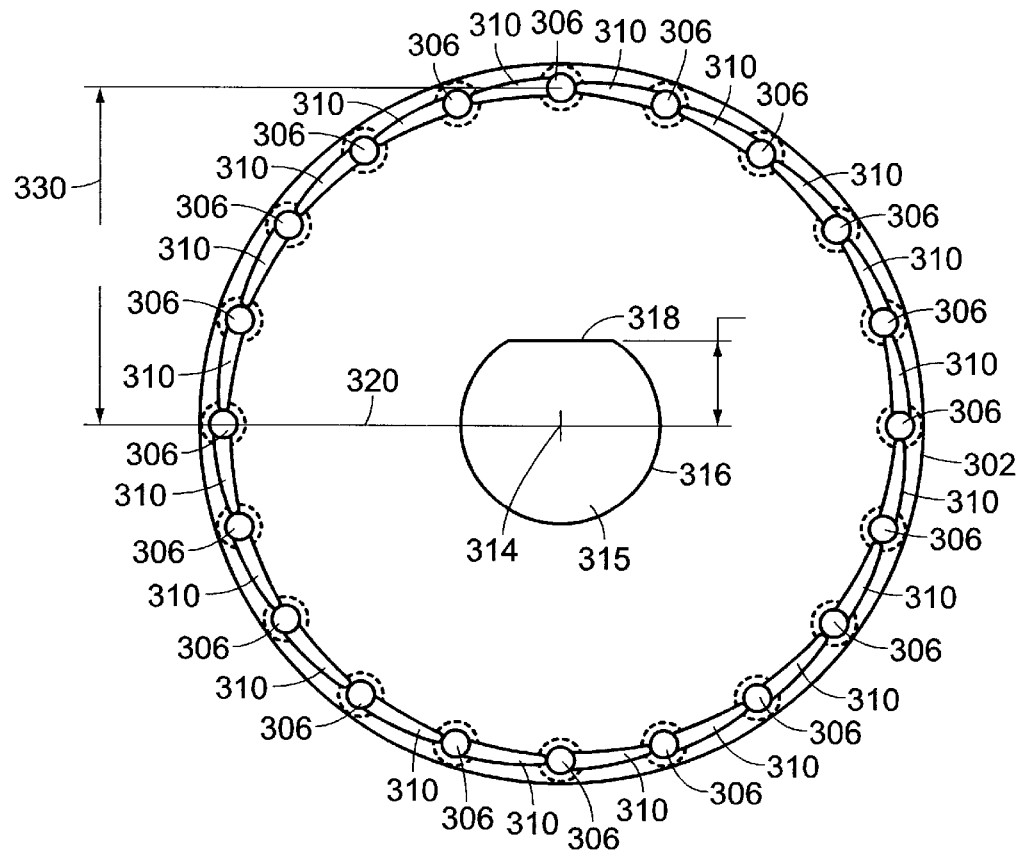
FIG. 12A is a diagrammatic plan view of an escapement wheel.
Figure 12B:
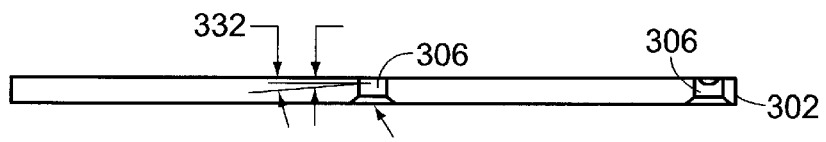
FIG. 12B is a diagrammatic side view of the escapement wheel.
Figure 13A:
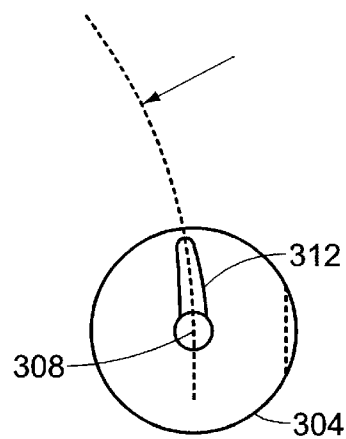
FIG. 13A is a diagrammatic top view of a placement tube.
Figure 13B:
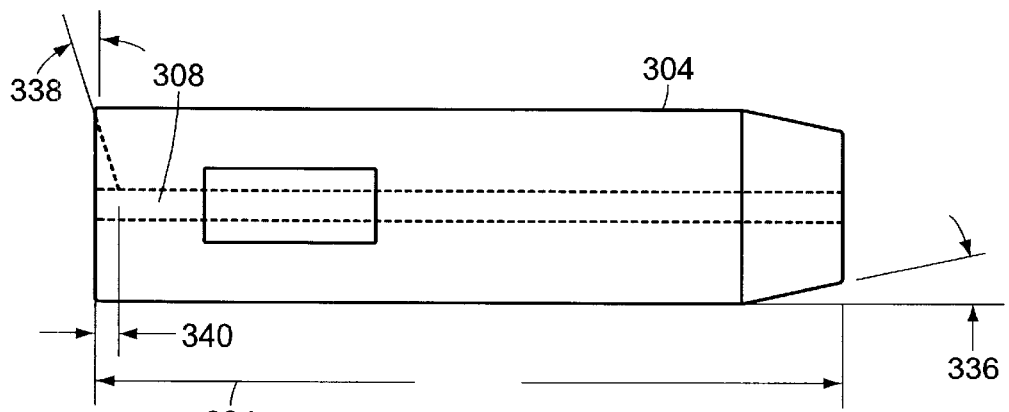
FIG. 13B is a diagrammatic side view of the placement tube.

FIGS. 11, 12A–12B, and 13A–13B illustrate portions of a specific embodiment in which an escapement wheel 302 serves as the toothed disc, an outer casing 303 serves as outer casing 17B, and a placement tube 304 serves as the dispensing tube 28. The escapement wheel has holes 306 and the tube has a hole 308, and each of the holes 306, 308 has a diameter slightly larger than that of the solder balls. As shown in FIG. 12B, each hole 306 tapers out to a larger diameter hole opening.at the bottom of the wheel 302.

Outer casing 303 has a protrusion 309, disposed above hole 308 and extending in the direction from which balls are delivered by wheel 302, that serves as end 34 to help to block balls from entering a hole 306 that is aligned with hole 308. Accordingly, protrusion 309 operates to help prevent the dispensing of more than one ball at a time.

The opening of each hole 306 is associated, at the top of the wheel 302, with a respective "comet trail" indentation 310 on the top surface of the wheel 302. Hole 308 of tube 304 is associated, at the top of the hole, with a tube comet trail indentation 312 on the top surface of the tube 304. Indentations 310 help to prevent balls that lie above filled holes 306 from becoming jammed under protrusion 309, by allowing such balls to escape backward and out of the way as wheel 302 rotates forward. Indentation 312 operates to facilitate the proper downward and forward progress of the ball that is next to be dispensed. As the ball approaches hole 308, the ball starts to fall out of corresponding hole 306 before the hole 306 is fully aligned with hole 308, and the ball is guided by indentation 312 toward hole 308.

In at least one case, the following dimensions are advantageous. Wheel 302 has a diameter of 0.930 inches. A hole 315 is disposed in the middle of wheel 302. Hole 315 is defined by a 0.2525 diameter circle 316 that is concentric with wheel 302 and by a line segment 318 that intersects circle 316 and is parallel to, and is spaced 0.1065 inches from, a wheel radial line 320 that intersects the wheel's center 314 and the center of a hole 306.

The center of each hole 306 is spaced a distance 330 of 0.430 inches from the center of wheel 302. In the case of a quantity of 20 holes 306, the centers of the holes 306 are disposed at 18 degree intervals along the circle that is concentric with the wheel's center and that is defined by the 0.430 inch radius. Each hole 306 has a diameter of 0.035 inches at the top. The sides of the tapering portion at the bottom of each hole 306 are at a 60 degree angle to horizontal.

Each "comet tail" indentation 310 has an internal trough shape that has a curve with a 0.015 inch radius and that grows deeper, at a 5 degree angle 332 to horizontal, in approach to the corresponding hole 306. Viewed from the top, each indentation 310 has a lengthwise curved orientation such that the indentation is substantially centered on and substantially tracks a circle that is concentric with the wheel 302 and that has a radius of 0.430 inches.

Tube 304 has a diameter of 0.1875 inches at the top and a length of 0.750 inches. The bottom 0.100 portion of tube 304 tapers inward at a 30 degree angle 336 to vertical (i.e., to the lengthwise dimension of tube 304). Hole 308 is concentric with the top of tube 304 and has a diameter of 0.035 inches. Indentation 312 has a lengthwise curved orientation such that the indentation is substantially centered on and substantially tracks a circle having a center that is 0.430 inches from the center of hole 308. Indentation 312 has an incline 338 of 10 degrees toward hole 308 and thereby reaches a maximum depth 340 of 0.015 inches at the edge of the hole.

Some or all of the surfaces that contact other surfaces are polished to an 8 microinch finish.

In a specific embodiment, an item holder such as the disc or the wheel may be configured and positioned so that the item holder has a thickness (e.g., 1 or 2 thousandths of an inch) that is much less than the diameter of the solder ball and the item holder is elevated slightly (e.g., to a height that is approximately half the diameter of the solder ball) from the bottom of the casing. Thus, the item holder contacts the solder ball only at the solder ball's equator area.

Other embodiments are within the scope of the following claims. For example, items being dispensed such as solder balls may be carried by any conveyer that allow the items to be delivered to a dispensing outlet into which entry is blocked by another means. Such a conveyer may include multiple parts or sections, and may include, for example, one or more belts or screens. Any resilient material, such as molded plastic or graphite, may be used in the components of the dispensing apparatus. In some case, it may be advantageous to lubricate or apply a surface treatment to one or more components of the dispensing apparatus. The size of the components may be scaled proportionately or disproportionally to suit a particular application (e.g., to dispense microscopic spheres such as in a micromanufacturing context, or to dispense marbles or bowling balls). Indentations associated with the teeth and holes may be tuned to work with particular solder ball sizes and weights, and may take the form of any of a variety of ramps, chutes, slots, inclines, gutters, trenches, channels, troughs, or guides.

What is claimed is:

1. Dispensing apparatus for dispensing solder balls, the dispensing apparatus comprising:

a dispensing outlet;

an item holder having solder ball holding areas and being movably disposed to position the solder ball holding areas one at a time in sequence over the dispensing outlet so that when one of the solder ball holding areas is positioned over the dispensing outlet, the other solder ball holding areas are not disposed over the dispensing outlet; and a blocker disposed over the item holder opposite the dispensing outlet, the blocker including a fluid delivery device, the blocker blocking solder balls from entering the dispensing outlet from directly above the item holder when the item holder positions one of the solder ball holding areas over the dispensing outlet.

2. The dispensing apparatus of claim 1, wherein the item holder comprises a rotatable disc having teeth, and the solder ball holding areas comprise areas between the teeth.

3. The dispensing apparatus of claim 1, wherein the item holder comprises a rotatable escapement wheel having through holes, and the solder ball holding areas comprise the through holes.

4. The dispensing apparatus of claim 3, wherein at least one of the through holes has a larger opening at the bottom than at the top.

5. The dispensing apparatus of claim 1, further comprising:

a drive mechanism arranged to cause the item holder to rotate.

6. The dispensing apparatus of claim 5, further comprising:

a control mechanism arranged to cause the drive mechanism to rotate the item holder in discrete steps.

7. The dispensing apparatus of claim 1, further comprising:

an enclosed chamber disposed above the item holder, the chamber being able to store solder balls for distribution to the solder ball holding areas.

8. The dispensing apparatus of claim 1, further comprising:

a shaft piece disposed above the item holder and configured to rotate with the item holder.

9. The dispensing apparatus of claim 6, wherein the solder ball holding areas are disposed near the periphery of the item holder; and the shaft piece comprises a flared bottom, so that solder balls are directed to the periphery of the item holder by the flared bottom.

10. The dispensing apparatus of claim 6, wherein the shaft piece comprises a clutch mechanism.

11. The dispensing apparatus of claim 8, wherein the shaft piece comprises a top portion and a bottom portion and the clutch mechanism connects the top portion to the bottom portion.

12. The dispensing apparatus of claim 11, wherein the clutch mechanism is configured to disconnect the top portion from the bottom portion when rotational resistance above a threshold amount is encountered by at least one of the portions.

13. The dispensing apparatus of claim 1, wherein the blocker comprises an end of an air tube arranged to supply air under pressure.

14. The dispensing apparatus of claim 13, wherein the air tube is configured to supply pressurized air in pulses that are substantially synchronized with the rotation of the item hole in discrete steps.

15. The dispensing apparatus of claim 1, wherein the top surface of the item holder comprises elongated indentations that are disposed so that each of the solder ball holding areas is associated with a respective one of the elongated indentations.

16. The dispensing apparatus of claim 15, wherein at least one of the elongated indentations is deeper at an end proximate the respective solder ball holding area than at an end distal the respective solder ball holding area.

17. The dispensing apparatus of claim 1, further comprising a placement tube extending down below the item holder, the placement tube including a placement hole that serves as the dispensing outlet.

18. The dispensing apparatus of claim 17, wherein the placement tube has a top surface or which is disposed an elongated indentation that is associated with the placement hole.

19. The dispensing apparatus of claim 18, wherein the elongated indentation is deeper at an end proximate the placement hole than at an end distal the placement hole.

20. Dispensing apparatus for dispensing items, the dispensing apparatus comprising:
   a dispensing outlet;
   an item holder having item holding areas and being movably disposed to position the item holding areas one at a time in sequence over the dispensing outlet so that when one of the item holding areas is positioned over the dispensing outlet, the other item holding areas are not disposed over the dispensing outlet; and
   a blocker disposed over the item holder opposite the dispensing outlet, the blocker including a fluid delivery device, the blocker blocking access to the dispensing outlet from directly above the item holder when the item holder positions one of the item holding areas over the dispensing outlet, wherein the blocker comprises an end of an air tube arranged to supply air under pressure;
   wherein the air tube is configured to supply pressurized air in pulses that are substantially synchronized with the rotation of the item holder in discrete steps.

21. The dispensing apparatus of claim 20, wherein the item holder comprises a rotatable disc having teeth, and the solder ball holding areas comprise areas between the teeth.

22. The dispensing apparatus of claim 20, wherein the item holder comprises a rotatable escapement wheel having through holes, and the solder ball holding areas comprise the through holes.

23. The dispensing apparatus of claim 22, wherein at least one of the through holes has a larger opening at the bottom than at the top.

24. The dispensing apparatus of claim 20, further comprising:
   a drive mechanism arranged to cause the item holder to rotate.

25. The dispensing apparatus of claim 24, further comprising:
   a control mechanism arranged to cause the drive mechanism to rotate the item holder in discrete steps.

26. The dispensing apparatus of claim 20, further comprising:
   an enclosed chamber disposed above the item holder, the chamber being able to store items for distribution to the item holding areas.

27. The dispensing apparatus of claim 20, further comprising:
   a shaft piece disposed above the item holder and configured to rotate with the item holder.

28. The dispensing apparatus of claim 27, wherein
   the item holding areas are disposed near the periphery of the item holder; and
   the shaft piece comprises a flared bottom, so that items are directed to the periphery of the item holder by the flared bottom.

29. The dispensing apparatus of claim 27, wherein the shaft piece comprises a clutch mechanism.

30. The dispensing apparatus of claim 29, wherein the shaft piece comprises a top portion and a bottom portion and the clutch mechanism connects the top portion to the bottom portion.

31. The dispensing apparatus of claim 30, wherein the clutch mechanism is configured to disconnect the top portion from the bottom portion when rotational resistance above a threshold amount is encountered by at least one of the portions.

32. The dispensing apparatus of claim 20, wherein the top surface of the item holder comprises elongated indentations that are disposed so that each of the item holding areas is associated with a respective one of the elongated indentations.

33. The dispensing apparatus of claim 32, wherein at least one of the elongated indentations is deeper at an end proximate the respective item holding area than at an end distal the respective item holding area.

34. The dispensing apparatus of claim 20, further comprising a placement tube extending down below the item holder, the placement tube including a placement hole that serves as the dispensing outlet.

35. The dispensing apparatus of claim 34, wherein the placement tube has a top surface on which is disposed an elongated indentation that is associated with the placement hole.

36. The dispensing apparatus of claim 35, wherein the elongated indentation is deeper at an end proximate the placement hole than at an end distal the placement hole.

* * * * *